United States Patent Office 3,320,272
Patented May 16, 1967

3,320,272
PROCESS FOR PREPARING 2-ALKOXYCYCLO-HEPTIMIDAZOLE DERIVATIVES
Genshun Sunagawa and Mitsuo Watatani, Shinagawa-ku, Tokyo, Japan, assignors to Sankyo Company, Limited, Tokyo, Japan
No Drawing. Filed Sept. 10, 1963, Ser. No. 307,810
Claims priority, application Japan, Oct. 1, 1962, 37/43,387
1 Claim. (Cl. 260—309)

This invention relates to a novel process for preparing 2-alkoxycycloheptimidazole derivatives. More particularly, it relates to a novel process for preparing 2-alkoxycycloheptimidazole derivatives having the formula

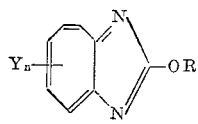

(I)

wherein Y is hydrogen, a lower alkyl group, which may be either straight or branched in the chain structure and contains from 1 to 5 carbon atoms such as methyl, ethyl, propyl, isopropyl, isobutyl or isoamyl, an unsubstituted or substituted phenyl group such as phenyl, p-nitrophenyl, p-chlorophenyl or p-methoxyphenyl, an aralkyl group such as benzyl or phenethyl having or not having one or more substituents on the phenyl moiety, halogen, nitro group, cyano group, hydroxy group, an alkoxy group containing from 1 to 5 carbon atoms such as methoxy or ethoxy, an aliphatic or aromatic acyl group such as formyl, acetyl, propionyl or benzoyl having or not having one or more substituents on the phenyl moiety, an alkoxycarbonyl group containing from 2 to 6 carbon atoms such as methoxycarbonyl or ethoxycarbonyl or an unsubstituted or substituted amino group such as amino, monoloweralkylamino, diloweralkylamino or acylamino, Y's may be same or different from one another when $n$ is 2 or 3, $n$ is an integer from 1 to 3 and R is a lower alkyl group.

Some of the compounds having the aforementioned Formula I are known compounds, which have been found by us to possess potent analgesic and inflammatory activities. In addition, the compounds having the aforementioned Formua I produced according to the process of this invention are also useful as intermediates for the synthesis of potent analgesic and antiinflammatory agents. For example, the compounds of the aforementioned Formula I may be converted by acid or alkali hydrolysis to compounds having the formua

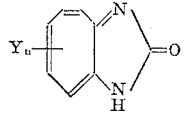

and the latter compounds may be converted by a process described in U.S. patent application Ser. No. 234,249 filed on October 30, 1962, now abandoned, but refiled as continuation-in-part application Ser. No. 428,232, filed January 26, 1965, now U.S. Patent 3,205,235, to 1-substituted cycloheptimidazol-2(1H)-one derivatives useful as analgesic and antiinflammatory agents.

Hithertofore, it is known to react cycloheptimidazolones with diazomethane to produce 2-alkoxycycloheptimidazoles. A process comprising reacting the same with phosphorus oxychloride in the presence of pyridine to give 2-chlorocycloheptimidazole, which in turn is treated with sodium alkoxide, thus yielding 2-methoxycycloheptimidazoles is also known.

However, the former process using diazomethane is disadvantageous in the formation of by-products other than the desired compound which results in low yield. The latter process has the disadvantage of consisting of two steps with complex procedures and low yield of the product. Moreover, the use of the aforementioned known processes is rather limited due to their extreme difficulty to produce the 2-alkoxycycloheptimidazoles with substituents such a halogen, nitro, cyano, alkoxy or the like on the cycloheptyl moiety, because it is practically impossible to produce the cycloheptimidazolones having said substituents.

As a result of investigations for finding simple and economical process for preparing 2-alkoxycycloheptimidazoles, we have found that reaction of a 2-substituted tropone derivative having the Formula II below with an isourea derivative having the Formula III below produces easily 2-alkoxycycloheptimidazole derivatives having the aforementioned Formula I.

It is the object of this invention to provide a novel process for preparing 2-alkoxycycloheptimidazole derivatives having the aforementioned Formula I, which is simple and economical.

According to this invention, the desired compounds of the Formula I are produced by reacting a 2-substituted tropone derivative having the formula

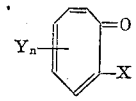

(II)

wherein X represents halogen, lower alkoxy or tosyloxy and Y and $n$ have the same meanings as above with an isourea derivative having the formula

(III)

wherein R has the same meaning as above in the absence of an alkaline substance or a salt thereof in the presence of equimolar amount of an alkaline substance.

The process of this invention is represented chemically by the following equation.

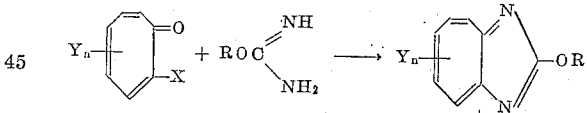

In carrying out the process of this invention, 2-substituted tropone derivative of the aforementioned Formula II is dissolved or suspended in a suitable solvent, followed by treatment with isourea derivative of the aforementioned Formula III or salt thereof. As the solvent suitably used in the step are mentioned organic solvents such as alcohol, dioxane, benzene and toluene, mixtures of water and water-miscible organic solvent such as water-ethanol. The most suitable reaction temperature in this step is refluxing temperature of the solvent used, but higher or lower temperatures may be applied for smooth reaction. The reactant isourea derivative in the process of this invention may be either the free or salt form, although in the use of a salt of isourea derivative it is necessary to convert the salt to the free form by treating the former with equimolar amount of an alkaline substance in or outside the reaction system prior to the reaction with 2-substituted tropone derivative of the aforementioned Formula II. Examples of the alkaline substance used include alkali metals such as metallic sodium, alkali metal hydrides such as sodium hydride and potassium hydride, alkali metal amides such as sodium amide and potassium amide, alkali metal alkoxides such as sodium ethoxide and sodium t-butoxide, alkali metal hydroxides such as sodium hydroxide and potassium hydroxide, alkali metal carbonate such as sodium carbonate and potassium carbonate and alkali metal bicarbonates such as potassium bicarbonate and sodium bicarbonate.

After completion of the reaction, the compounds of the aforementioned Formula I may be isolated by one of the conventional methods. For example, after completion of the reaction, the solvent is removed by distillation under reduced pressure and the residue is recrystallized from a suitable solvent, the desired product being obtained advantageously.

In accordance with this invention the desired 2-alkoxycycloheptimidazole derivatives may be produced in a very simple and easy way. The reaction involved is a ring cyclization reaction between 2-substituted tropone and isourea derivative of the aforementioned Formula III, which may proceed in the same way with the tropones having the substituents as mentioned above that do not participate in the reaction. Therefore, the reaction is advantageous in that there may be produced 2-alkoxycycloheptimidazole derivatives having substituents on the cycloheptyl moiety such as halogen, nitro, cyano or alkoxy.

This invention is illustrated in the following examples. It is to be understood that they are not intended to limit the scope of the invention.

*Example 1*

To a solution of 253 mg. of metallic sodium in 20 ml. of methanol is added 1.22 g. of O-methylisourea hydrochloride. The mixture is stirred for 5 min., followed by addition of 1.36 g. of 2-methoxytropone. The resulting mixture is heated under reflux with stirring for 7 hours. The reaction mixture is then cooled and filtered. The filtrate is concentrated in vacuum and the residue obtained is chromatographed on alumina for the purification to give crystalline 2-methoxycycloheptimidazole, M.P. 94° C.

*Analysis.*—Found: C, 67.59; H, 5.01; N, 17.20. Calc'd. for $C_9H_8N_2$: C, 67.48; H, 5.03; N, 17.49.

*Example 2*

To a solution of 253 mg. of metallic sodium in 20 ml. of ethanol is added 1.37 g. of O-ethylisourea hydrochloride. The mixture is stirred for a while, followed by filtration. The filtrate produced is added to a solution of 1.36 g. of 2-methoxytropone in 20 ml. of ethanol and the resulting mixture is heated under reflux with stirring for 7 hours. The reaction mixture is then cooled and the solvent is removed by distillation under reduced pressure. The residue is recrystallized from benzene-cyclohexane to give crystalline 2-ethoxycycloheptimidazole melting at 101–102° C.

*Analysis.*—Found: C, 68.84; H, 5.83; N, 15.90. Calc'd. for $C_{10}H_{10}N_2O$: C, 68.95; H, 5.79; N, 16.08.

*Example 3*

To a solution of 0.518 g. of metallic sodium in 70 ml. of ethanol is added 2.31 g. of O-ethylisourea hydrochloride, followed by stirring for a while. To the resulting mixture is added 4.3 g. of 5-bromo-2-methoxytropone. The mixture is heated under reflux with stirring for 5 hours. The reaction mixture is then cooled and filtered. The filtrate is concentrated under reduced pressure and the residue is recrystallized from water to give 6-bromo-2-ethoxycycloheptimidazole as pale yellow crystals melting at 140–141° C.

*Analysis.*—Found: C, 47.38; H, 3.52; N, 10.76. Calc'd. for $C_{10}H_9N_2OBr$: C, 47.45; H, 3.58; N, 11.07.

*Example 4*

To a solution of 1.01 g. of metallic sodium in 80 ml. of n-butanol is added 5.5 g. of O-ethylisourea hydrochloride, followed by stirring for a while. To the resulting mixture is added 8.6 g. of 2-bromo-7-methoxytropone and the mixture is heated under reflux with stirring for 7 hours. The reaction mixture is then cooled and filtered. The filtrate is concentrated under reduced pressure and the residue is recrystallized from water to give 4 g. of 4-bromo-2-ethoxycycloheptimidazole as pale yellow crystals melting at 141–142° C.

*Analysis.*—Found: C, 47.17; H, 3.72; N, 11.45. Calc'd. for $C_{10}H_9N_2OBr$: C, 47.45; H, 3.58; N, 11.07.

*Example 5*

To a solution of 4 ml. of water containing 0.16 g. of sodium hydroxide and 20 ml. of ethanol is added 0.513 g. of O-ethylisourea hydrochloride, followed by stirring for a while. To the resulting mixture is added 0.486 g. of 3-cyano-2-methoxytropone and the mixture is heated under reflux with stirring for 7 hours. The reaction mixture is then cooled and the crystals precipitated are separated by filtration. Recrystallization from ethanol gives 0.47 g. of crystalline 4-cyano-2-ethoxycycloheptimidazole, M.P. 231–232° C.

*Analysis.*—Found: C, 66.03; H, 4.51; N, 21.14. Calc'd. for $C_{11}H_9N_5$: C, 66.32; H, 4.55; N, 21.10.

*Example 6*

To a solution of 148 mg. of metallic sodium in 40 ml. of ethanol are added 805 mg. of O-ethylisourea hydrochloride, followed by stirring for a while. To the resulting mixture is added 1 g. of 5-chloro-2-methoxytropone and the mixture is heated under reflux with stirring for 6 hours. The reaction mixture is then cooled and filtered. The filtrate is concentrated under reduced pressure and the residue is chromatographed on alumina for the purification to give 6-chloro-2-ethoxycycloheptimidazole as white needles melting at 129–130° C.

*Analysis.*—Found: C, 57.73; H, 4.32; N, 13.47. Calc'd. for $C_{10}H_9ON_2Cl$: C, 57.56; H, 4.35; N, 13.43.

*Example 7*

To a solution of 253 mg. of metallic sodium in 40 ml. of ethanol is added 1.37 g. of O-ethylisourea hydrochloride, followed by addition of 1.94 g. of 2-methoxy-7-methoxycarbonyltropone. The mixture is heated under reflux with stirring for 8 hours. The reaction mixture is then filtered and the filtrate is concentrated under reduced pressure. The residue is chromatographed on alumina to give 1.8 g. of 2-ethoxy-4-methoxycarbonyl cycloheptimidazole as a yellow oily substance, which on treatment with picric acid gives the picrate melting at 141–142° C.

*Analysis.*—Found: C, 47.14; H, 3.48; N, 15.35. Calc'd. for $C_{18}H_{15}O_{10}N_5$: C, 46.36; H, 3.28; N, 15.18.

*Example 8*

To a suspension of 4.52 g. of 2-methoxy-5-nitrotropone in 250 mg. of ethanol is added 2.4 g. of freshly distilled O-ethylisourea. The mixture is heated under reflux with stirring for 3.5 hours. The reaction mixture is then concentrated to precipitate crystals, which are recrystallized from ethanol to give 2-ethoxy-6-nitrocycloheptimidazole as yellow scales melting at 161–162° C.

*Analysis.*—Found: C, 54.78; H, 4.23; N, 19.02. Calc'd. for $C_{10}H_9N_3O_3$: C, 54.79; H, 4.14; N, 19.17.

*Example 9*

To a solution of 253 mg. of metallic sodium dissolved in 20 ml. of ethanol is added 1.37 g. of O-ethylisourea hydrochloride. After a short period of time, 2.76 g. of 2-tosyloxytropone is added to the mixture and the mixture is heated under reflux for 7 hours. After completion of the reaction, the solvent is distilled off from the reaction mixture, the residue is dissolved in benzene and the benzene solution is passed through an alumina column. The benzene is distilled off from the effluent to give 2-ethoxycycloheptimidazole melting at 101–102° C.

*Analysis.*—Calc'd. for $C_{10}H_{10}N_2O$: C, 68.95; H, 5.79; N, 16.08. Found: C, 68.97; H, 5.82; N, 15.95.

Example 10

To a solution 253 mg. of metallic sodium dissolved in 40 ml. of ethanol is added 1.37 g. of O-ethylisourea hydrochloride and the mixture is stirred. 1.75 g. of 2,5-dichlorotropone is added to the mixture and the mixture is heated with stirring for 8 hours. After completion of the reaction, the ethanol is distilled off from the reaction mixture, the residue is neutralized with diluted aqueous sodium bicarbonate solution and extracted with benzene. The extract is dried and passed through an alumina column. The benzene is distilled off from the effluent to give 6-chloro-2-ethoxycycloheptimidazole as white needles melting at 129–130° C.

*Analysis.*—Calc'd. for $C_{10}H_9ON_2Cl$: C, 57.56; H, 4.35; N, 13.43. Found: C, 57.61; H, 4.36; N, 13.47.

Example 11

To a solution of 253 mg. of metallic sodium dissolved in 40 ml. of n-butanol is added 1.67 g. of O-n-butylisourea hydrochloride and the mixture is stirred for a short period of time. 1.36 g. of 2-methoxytropone is added to the mixture and the mixture is heated under reflux with stirring for 7 hours. After completion of the reaction, the solvent is distilled off from the reaction mixture, the residue is dissolved in benzene and the benzene solution is passed through an alumina column. The benzene is distilled off from the effluent and the residual oily substance, which is 2-n-butoxycycloheptimidazole, is treated with picric acid to give 2-n-butoxycycloheptimidazole picrate melting at 172–173° C.

*Analysis.*—Calc'd. for $C_{18}H_{17}O_8N_5$: C, 50.12; H, 3.97; N, 16.24. Found: C, 50.03; H, 4.00; N, 16.38.

Example 12

To a solution of 253 mg. of metallic sodium dissolved in 40 ml. of ethanol are added 1.37 g. of O-ethylisourea hydrochloride and 1.79 g. of 2-methoxy-5-dimethylaminotropone and the mixture is heated under reflux with stirring for 7 hours. After completion of the reaction, the ethanol is distilled off from the reaction mixture, the residue is dissolved in benzene and the benzene solution is passed through an alumina column. The benzene is distilled off from the effluent to give 2-ethoxy-6-dimethylaminocycloheptimidazole as crystalline material melting at 159–160° C.

*Analysis.*—Calc'd for $C_{12}H_{15}ON_3$: C, 66.34; H, 6.96; N, 19.34. Found: C, 66.40; H, 6.98; N, 19.36.

Example 13

To a solution of 253 mg. of metallic sodium dissolved in 40 ml. of ethanol are added 1.37 g. of O-ethylisourea hydrochloride and 1.79 g. of 2-methoxy-7-dimethylaminotropone and the mixture is heated under reflux with stirring for 7 hours. After completion of the reaction, the ethanol is distilled off from the reaction mixture, the residue is dissolved in benzene and the benzene solution is passed through an alumina column. The benzene is distilled off from the effluent to give 2-ethoxy-4-dimethylaminocycloheptimidazole as crystalline material melting at 92–93° C.

*Analysis.*—Calc'd. for $C_{12}H_{15}ON_3$: C, 66.34; H, 6.96; N, 19.34. Found: C, 66.24; H, 6.92; N, 19.19.

Example 14

To a solution of 253 mg. of metallic sodium dissolved in 40 ml. of ethanol is added 1.37 g. of O-ethylisourea hydrochloride. After a short period of time, 1.94 g. of 2,5-diethoxytropone is added to the mixture and the mixture is heated under reflux with stirring for 8 hours. After completion of the reaction, the solvent is distilled off from the reaction mixture, the residue is dissolved in benzene and the benzene solution is passed through an alumina column. The benzene is distilled off from the effluent to give 2.6-diethoxycycloheptimidazole as crystalline material melting at 119–120° C.

*Analysis.*—Calc'd. for $C_{12}H_{14}O_2N_2$: C, 66.03; H, 6.47; N, 12.84. Found: C, 65.95; H, 6.45; N, 13.14.

We claim:

A process for preparing a compound having the formula

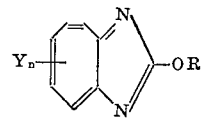

wherein Y is hydrogen, a straight or branched alkyl group of 1 to 5 carbon atoms, phenyl group, halogen, nitro group, cyano group, hydroxy group, an alkoxy group of 1 to 5 carbon atoms, an aliphatic acyl of 1 to 3 carbon atoms, an alkoxy-carbonyl group of 2 to 6 carbon atoms or dimethylamino group, Y's may be the same or different from one another when n is an integer of 2 or 3, n is an integer of 1 to 3 and R is an alkyl group of 1 to 4 carbon atoms which comprises reacting a compound having the formula

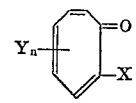

wherein Y and n are as defined above and X is halogen, an alkoxy group of 1 to 2 carbon atoms or tosyloxy group with a compound having the formula

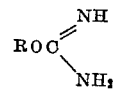

wherein R is as defined above or with a salt thereof in the presence of a sufficient amount of an alkaline substance to convert the said salt to the coreresponding free base, the said alkaline substance being seleted from the group consisting of an alkali metal and a hydride, amide, alkoxide, hydroxide, carbonate and bicarbonate thereof.

No references cited.

WALTER A. MODANCE, *Primary Examiner.*

NATALIE TROUSOF, *Assistant Examiner.*